United States Patent [19]

Marks et al.

[11] Patent Number: 5,760,786
[45] Date of Patent: Jun. 2, 1998

[54] SIMULTANEOUS CONSTRUCTIVE SOLID GEOMETRY (CSG) MODELING FOR MULTIPLE OBJECTS

[75] Inventors: Joseph Marks, Belmont; Sarah Gibson, Arlington, both of Mass.

[73] Assignee: Mitsubishi Electric Information Technology Center America, Inc., Cambridge, Mass.

[21] Appl. No.: 579,546

[22] Filed: Dec. 27, 1995

[51] Int. Cl.$^6$ .................................................. G06F 15/00
[52] U.S. Cl. .................................................. 345/441
[58] Field of Search .................. 395/120; 345/420, 345/419, 440, 441

[56] References Cited

U.S. PATENT DOCUMENTS 5,459,829 10/1995 Doi et al. ............................. 395/152
5,561,752 10/1996 Jevans .................................. 395/133

*Primary Examiner*—Phu K. Nguyen
*Attorney, Agent, or Firm*—Robert K. Tendler

[57] ABSTRACT

A system for simultaneously creating similar constructive solid geometry (CSG) representations for multiple objects in bit map or voxel form iteratively creates, mutates and optimizes a population of potential CSG representations of the objects. The system includes a first part which creates and revises two identical populations of CSG representations. Initially, the populations are randomly generated. Thus, each CSG tree includes a random number of primitives of different types, sizes and positions. The primitives are randomly organized in a tree structure which includes randomly selected boolean operators at the nodes. The trees are then modified through an evolutionary process to improve the CSG representations of the objects. Corresponding trees in each population are randomly mutated in the same manner to form new trees. Mutations can include (1) changes in types of primitives, (2) changes in a subtree structure, (3) addition of new subtrees, and (4) deletions of subtrees. If the new trees better represents the objects, then the old trees are replaced with the new trees. Mutations continue until no further improvements are obtained.

15 Claims, 6 Drawing Sheets

SIMULTANEOUS CONSTRUCTIVE SOLID GEOMETRY (CSG) MODELING FOR MULTIPLE OBJECTS

FIELD OF THE INVENTION

The present invention relates to automatic construction of constructive solid geometry (CSG) representations of objects. More particularly, it relates to creating similar CSG representations from scanned data of multiple objects in voxel format using evolutionary computation.

BACKGROUND OF THE INVENTION

Constructive solid geometry (CSG) is a term for modeling methods that define complex solids as compositions of simpler solids, called primitives. Boolean operators are used to execute the composition of the primitives into the solid. The solids may be in the form of two-dimensional or three-dimensional objects.

In the two-dimensional context, typical primitives are rectangles, triangles, and circles. Primitives in the three-dimensional context include boxes, tetrahedrons, cylinders, cones, and spheres. The boolean operations include union, difference, and intersection. CSG representations of the objects are ordered binary trees with leaves which are primitives and non-terminal nodes which are boolean operators.

CSG representations are useful in computer-related modeling of objects. Some form of CSG representation is typically used in computer aided design (CAD) systems and in current work on virtual reality systems. Other forms are also used for representing objects. A boundary representation defines an object according to its boundaries and edges. This representation describes the faces, edges, and vertices of the solid. In another representation, referred to as a volumetric representation, the object is described as an array of point data in two or three dimensions. Two dimensional point data, typically called pixels, represent areas in the object; three dimensional point data, typically called voxels, represent volumes of the object. Voxels will be used generally to refer to both two dimensional and three dimensional point data.

Due to the ease of manipulation, CSG representations are useful in executing changes from one object to another. In one form, the manipulation of one object to another is called morphing. In morphing, small changes are made to the original object until it appears as the second object. CSG representations can also provide for combining various characteristics of objects. In order to efficiently manipulate CSG representations from one object to another, the CSG trees should be similar in the types of primitives and the structure. The easiest changes can be made when the only differences between the CSG representations of two objects is the size and orientation of the primitives in the trees.

Although CSG models are good at representing objects and are easily manipulable, creation of a CSG model to represent a specific object can be difficult. These difficulties greatly increase when two similar representations must be created. Other forms of representation are more easily created. Boundary representations are similar to mechanical drawings of the object which show the dimensions of the various parts. A volumetric representation can be obtained from an actual object through scanning with a laser or other device.

Changing between representation formats is also not clearly defined in the prior art. Volumetric representations can be easily created from either the boundary or CSG representations, by generating the areas or volumes defined by the representations. Similarly, a set of algorithms, called a boundary evaluator, can be used to compute the boundary representation from the CSG representation. However, converting from the boundary representation to a CSG representation or from a volumetric representation to a boundary representation is significantly more difficult. Furthermore, no processes are known which convert directly from a volumetric representation to a CSG representation.

Vadim M. Shapiro and Donald L. Vossler have published a number of articles relating to the construction and optimization of CSG representations from boundary representations. Two such articles, "Construction and Optimization of CSG Representations", Computer Aided Design, January/February, 1991, and "Efficient CSG Representations of Two Dimensional Solids", Transactions of the ASME, September, 1991, discuss the difficulties with the various techniques which have been used to convert from boundary representations to CSG representations. These articles indicate that the difficulty in creating a CSG representation is that there is not a unique CSG description of the solid. Different sized, shaped, positioned, and types of primitives can be combined in a variety of ways to obtain the same solid form.

Existing techniques can be divided into partitioning methods and covering methods. In partitioning methods, a polygon is represented as a union of non-overlapping convex pieces. These methods lead to unnecessarily verbose CSG representations. The covering methods attempt to determine a set of overlapping pieces which cover the polygon and take advantage of the polygon's collinear edges. However, such methods are not always directly solvable depending on the form of the solid. Also, these techniques have generally been applied only to straight, planar objects. Discussion of curved planar and three-dimensional objects has been limited.

Shapiro and Vossler suggest a method using half spaces to define the CSG representation. They discuss various methods for determining whether a set of half spaces is sufficient and necessary to describe an object. They also discuss determining whether the set of half spaces is a minimum. They do not attempt to determine whether the half spaces are an absolute minimum, or approaching an absolute minimum, meaning that the set uses the fewest number of primitives to describe the object. Despite the full discussion of the use of half spaces in CSG representations, these articles do not discuss how to determine the half spaces for consideration in the set. Furthermore, in the creation of CSG representations useful in computer modeling, primitives are not defined as half spaces but typically basic geometric spaces.

In a more recent article, "Separation for Boundary to CSG Conversion", ACM Transactions on Graphics, January, 1993, Shapiro and Vossler discuss several mechanisms for determining half spaces which can be used in the set to define the solid. These systems produce representations with excessive and unnecessary half spaces.

In addition to the difficulties discussed by Shapiro and Vossler, none of the articles relate to conversion from a volumetric representation to a CSG representation. Although each point on the surface of the object can be easily represented as a point in three dimensional space, the boundaries are not easily definable from the voxel data. In order to create a boundary representation, all the points on the surface would have to be analyzed to determine where linear, curved or non-uniform edges exist and to determine equations for planar or arced faces and edges. Although some algorithms have been developed to make such a conversion, they are complex and of limited use.

Therefore, a need exists for a system which can easily and automatically convert from a voxel representation of a surface or object to a CSG representation of the object. A need also exists for a system which can easily create similar CSG representations for multiple objects.

SUMMARY OF THE INVENTION

The present invention provides a system for automatically converting from a voxel representation to a CSG representation and for converting multiple objects to similar CSG representations. In one aspect of the invention, a global algorithm generates a population of random CSG trees. The initial population is created by random generation of primitives, including type, size, position and orientation, and random combination of the primitives. Subsequent members of the population are created by random mutations to the existing population. In a preferred embodiment portions of the population which are less similar to the desired object are occasionally eliminated. In this manner, an evolutionary process is used to generate CSG trees which more closely represent the object. Furthermore, the present invention creates and mutates trees to obtain a CSG representation without the need to determine characteristics of the object, such as the location and size of edges and faces, as is required by the prior art.

In another aspect of the invention, an evaluation algorithm determines the closeness of each CSG tree in the population to the desired object. In a preferred embodiment, the closeness of a CSG tree to the object is determined based upon the number of voxels of the tree which are not in the object (excess), the number of voxels of the object which are not in the tree (uncovered), and the number of primitives in the tree. Including the number of primitives in the determination results in more efficient representations of the object. The efficiency is obtained without having to specifically determine whether each primitive is necessary, as the prior art requires. Using the number of excess voxels and uncovered voxels to determine closeness of the tree to the object provides an objective measure of the representation, which is also not available in the prior art.

In another aspect of the invention, in addition to evaluating the tree, minor variations are made to the primitives in order to more closely represent the desired object. The primitives are revised according to an evaluation in terms of position, size, and orientation. In a preferred embodiment, the excess and uncovered regions in a local area of a primitive are determined. Various characteristics of the distribution of voxels in the excess and uncovered regions are then used to indicate a direction and amount of movement of the primitives in the tree.

In order to create similar CSG representations of multiple objects, multiple identical sets of populations are initially created. The same mutations are performed upon corresponding trees in each of the populations. Then, each tree is separately optimized for the corresponding object. The goodness of fit of a representation is determined based upon the scores for all of the objects. Therefore, the better trees better represent all of the objects. In this manner, CSG representations are obtained for multiple objects which differ only in the position, size and orientation of the primitives.

DETAILED DESCRIPTION

The present invention will be more completely understood through the following detailed description which should be read in conjunction with the attached drawings in which similar reference numbers indicate similar structures.

Figure 1:
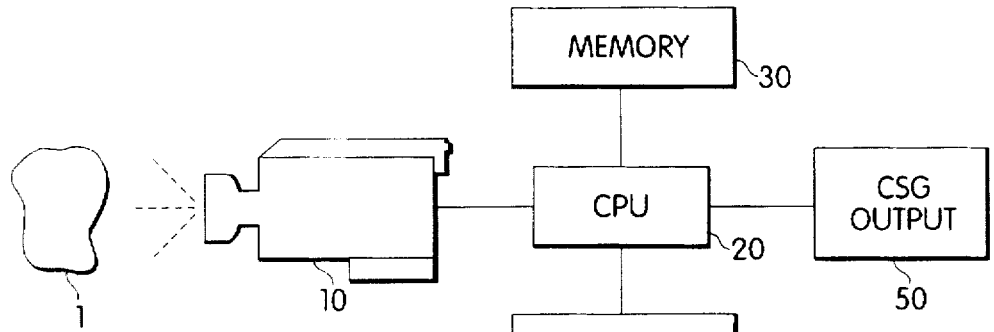
FIG. 1 is a block diagram of hardware for implementing the present invention.

FIG. 1 illustrates an apparatus for operation of the present invention. As illustrated in FIG. 1, a camera 10, scanner, or drawing editor is used to determine data about an object. The object data typically would include a bit map of voxels defining the area or volume of the object. The object data is stored in the memory 30 for comparison with CSG structures generated by the system. Object data can be obtained and stored for multiple objects. A central processing unit (CPU) 20 carries out the steps of the process to be described below in connection with the object data stored in the memory. The final output of the system is a CSG representation of the object. It can be output in various ways, including on a display 40 or an electronic format through an output 50 to another computer, or memory source.

Figure 2:
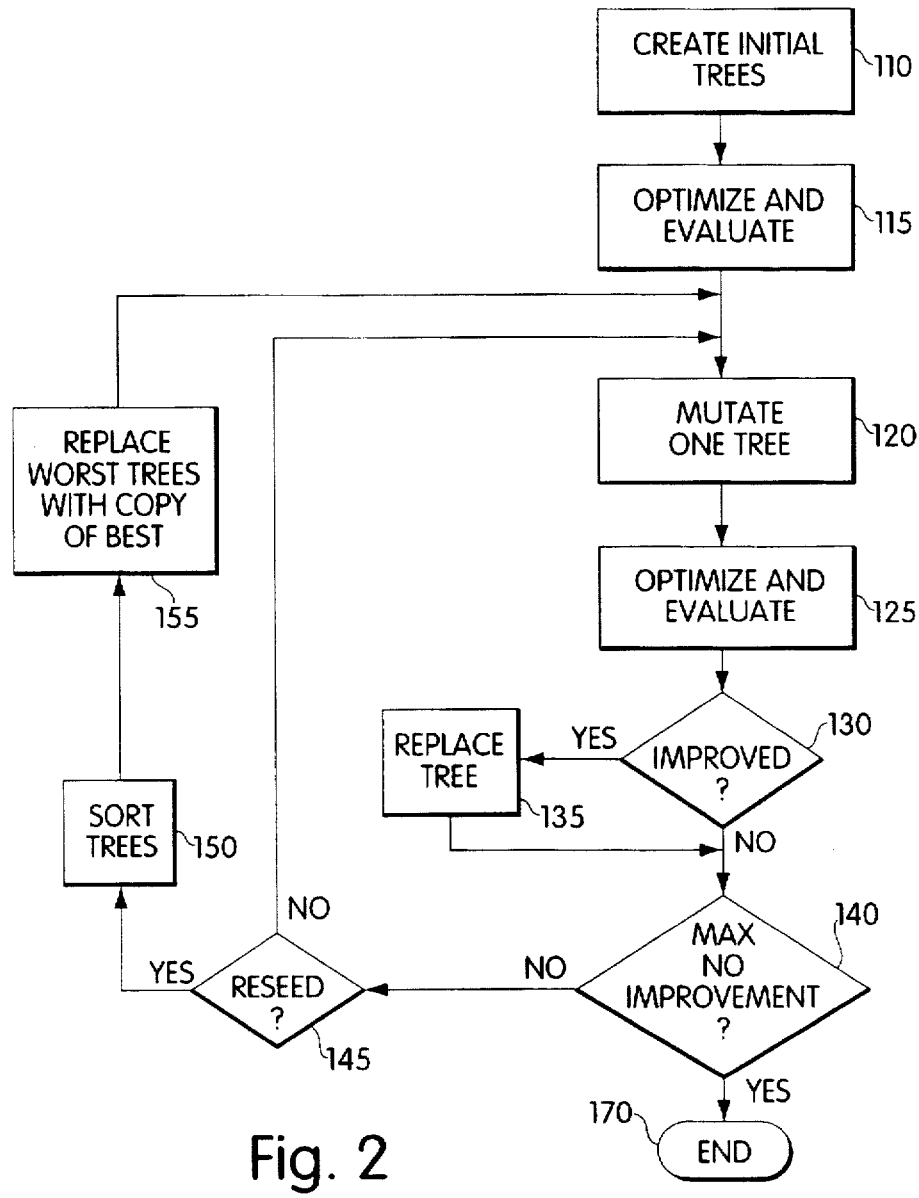
FIG. 2 illustrates the tree creation process.

Operation of the system for a single object is illustrated in the block flow diagram of FIG. 2. At step 110, a population of CSG trees is randomly created. A CSG tree creates a representation through the combination of a set of primitives. Each primitive has a defined type, size, position, and orientation in a coordinate system. Naturally, the coordinate system for the primitives would coincide with coordinate system used for determining the object data.

Figure 3:
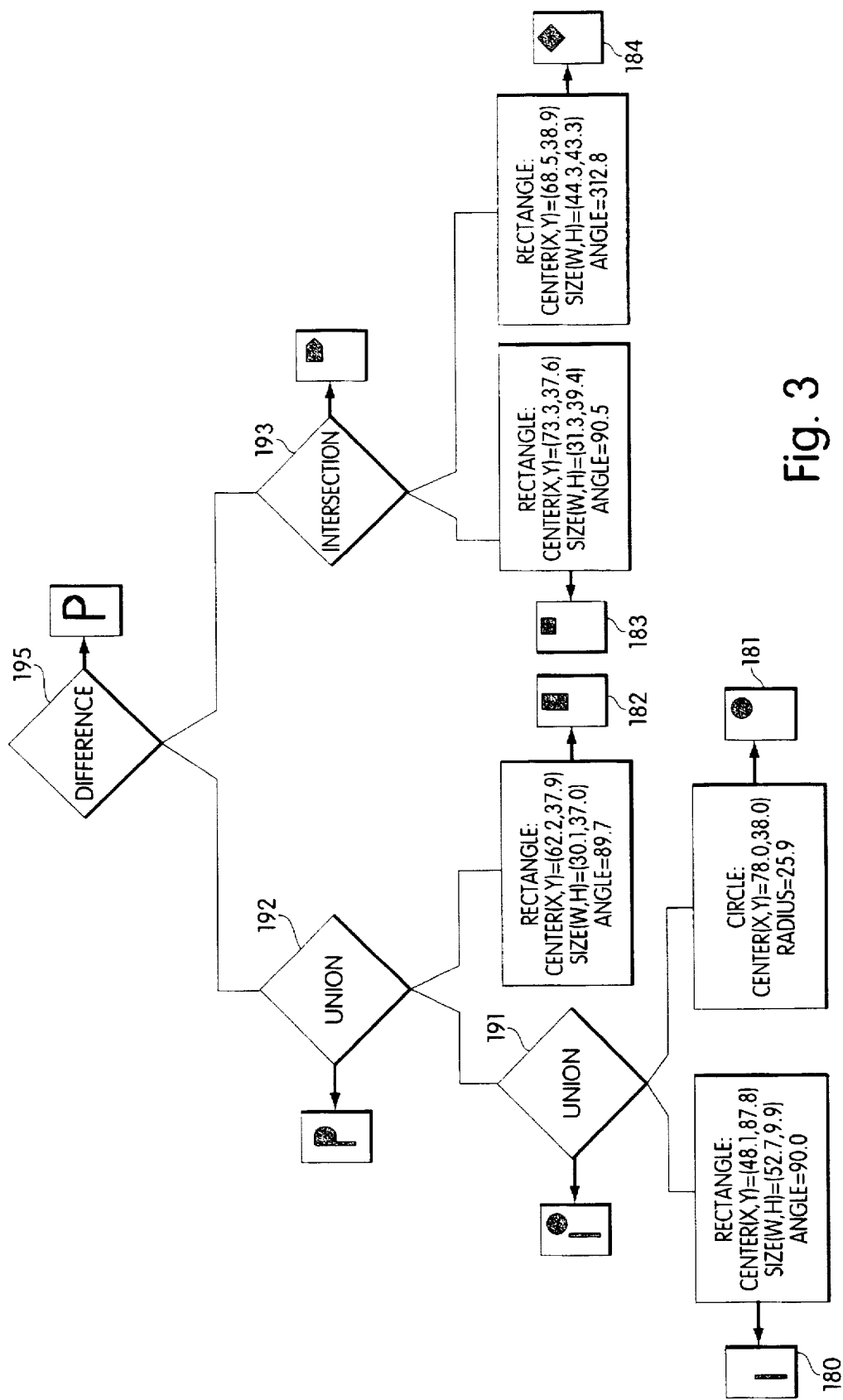
FIG. 3 is an illustration of a CSG tree structure.

FIG. 3 illustrates a CSG tree representation of a letter P using rectangles and a circle as primitives, as created by the present invention. Each terminal node or leaf 180–184 is a rectangular primitive. The primitive is defined by its position, width, height, and orientation. The interior nodes 191–193, 195 are boolean connectors for the leaves. The boolean connectors include union 191, 192, intersection 193, and difference 195. FIG. 3 also illustrates what the CSG representation looks like at each node of the tree. The top node 195 has the representation of the whole tree.

In creating the original tree population, the system randomly selects a set of primitives, selects subtree structures, and a set of boolean operators for each tree. A mean and standard deviation for numbers of primitives and subtree structures can be provided to the system in order to adjust the complexity of the initial tree population. For the subtree structures, at each node, the system separates the primitives in the subtrees into two parts, which become the subsequent left and right subtrees. The mean and standard deviations for subtree structures relate to how evenly the primitives are separated.

After the initial population is created, each of the trees is locally optimized and evaluated at step 115, as discussed below. The evaluation process determines a score for each tree which corresponds to the closeness to representing the target object. At step 120, a randomly selected tree is randomly mutated. Different types of mutations are possible. In a preferred embodiment, mutations include (1) changes in types of primitives. (2) changes in a subtree structure. (3) addition of new subtrees, and (4) deletions of subtrees. Changes in subtree structures include recreating the subtree with the same primitives, but with new nodes and different separations of primitives into subtrees. To add new subtrees, a single primitive is replaced by a plurality of primitives in a subtree. If a subtree is deleted, the node above the subtree is removed and the remaining subtree from that node is moved up the tree. Additionally, a boolean operation of an interior node could be changed.

A probability for each type of mutation can be set in order to control the types of variations in trees. Although the mutations in the preferred embodiment are random, controlled mutations can be made which could improve the time to determine a best tree. The mutated tree is then locally optimized and evaluated at step 125. If the mutated tree is better than the existing tree (step 130), then the mutated tree replaces the original tree (step 135). If the mutated tree is not better, then the existing tree is not replaced. The system provides an evolutionary process for determining trees which better represent the object.

In order to improve the evolutionary process, the poorer trees are occasionally removed from the population, referred to as reseeding (step 145). Reseeding can occur after a set number of mutations have occurred. In order to reseed, the trees are assorted according to their scores at step 150. At step 155, half of the trees having poorer scores are replaced with the trees having better scores. Each of the trees having a better score then exists twice in the population before further mutations occur. This causes the entire population to better represent the object and more quickly obtains the best tree. The random mutation process, including the occasional replacement of poorer trees, continues until no improvement has occurred for a predefined number of iterations (step 140). Once no further improvement in the best tree occurs, the process ends (step 170) and the best tree is outputted as the CSG representation of the object.

Figure 4:
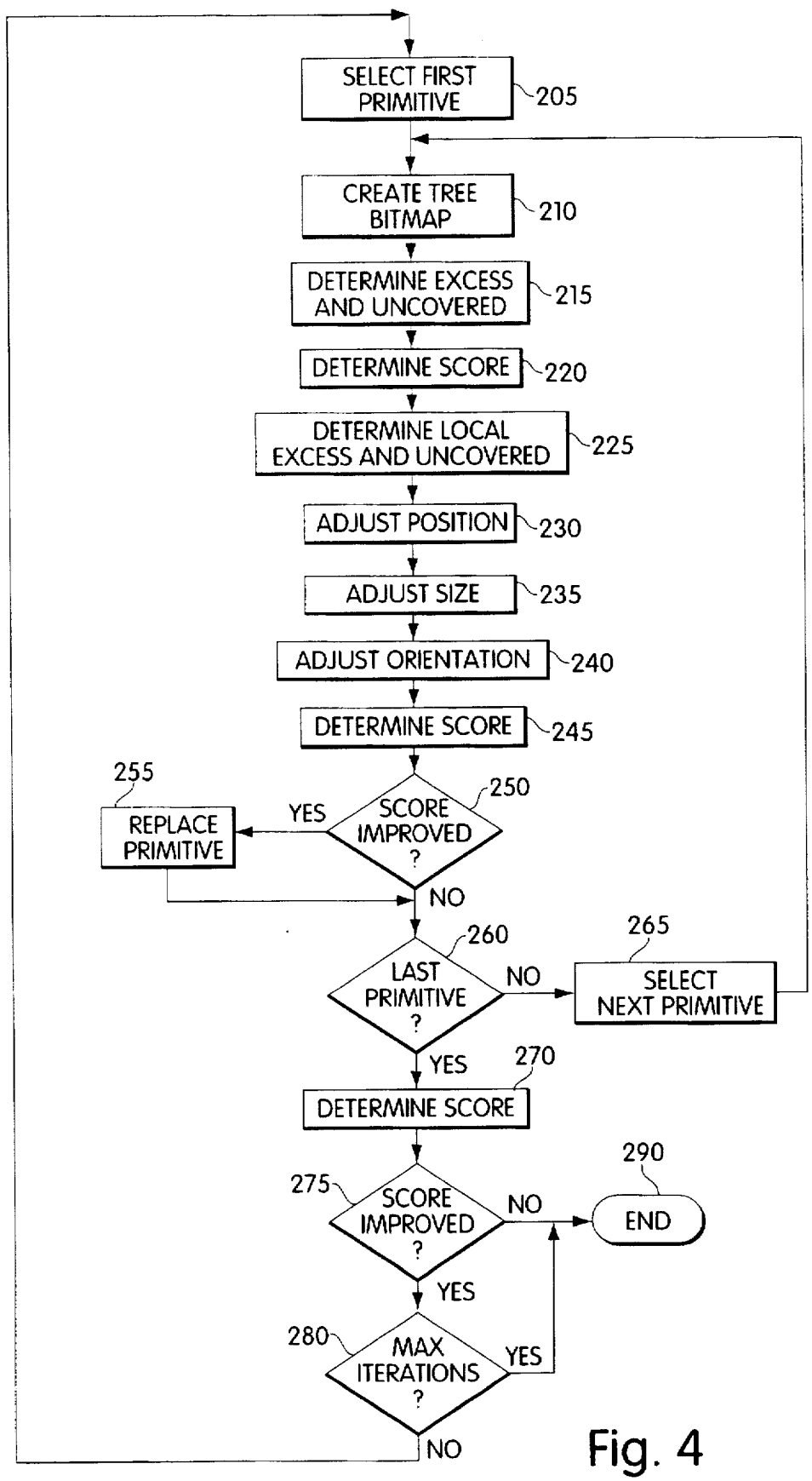
FIG. 4 illustrates the local optimization process.

The local optimization and evaluation of the trees, which occurs in steps 115 and 125, is illustrated in the block diagram of FIG. 4. Local optimization is used to make small changes in the position, size and orientation of the primitives in the CSG tree in order to better represent the object. Each primitive is separately manipulated. The first step, step 205, is to select the first primitive.

Then a tree bit map must be created, step 210. The CSG representation and the object data are not in the same format. As discussed above, the object data is a set of voxels or a bit map. In order to compare the representations, the CSG representation is also converted to a volumetric representation as a bit map. The tree bit map can be created by creating a bit map for each primitive in the tree. The bit maps for the primitives are then combined according to the boolean operations of the tree nodes. Once all of the boolean operations have been executed, the bit map represents the CSG representation for this tree.

Figure 5:
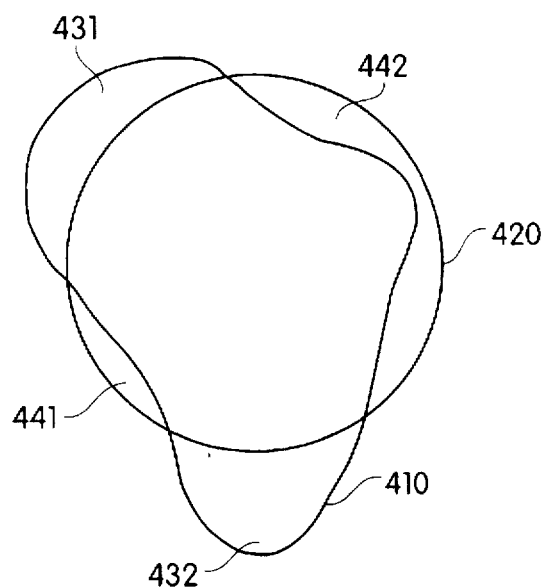
FIG. 5 illustrates coverage of an object by a CSG representation.

The system then compares the bits in the tree bit map to the bits in the object data to determine the fit, step 215. The fit is determined by the extent to which the tree bit map covers portions not in the object, called the excess, and the portions of the object which are not covered by the tree bit map, called the uncovered. FIG. 5 illustrates the excess regions 441, 442 and uncovered regions 431, 432 for an object 410 and CSG representation 420.

At step 220, a score for the CSG tree is determined to indicate how well the tree represents the object. According to a preferred embodiment, the score is equal to the sum of the number of excess voxels, the number of uncovered voxels, and the product of a multiplier and the number of primitives. The number of primitives is used in the score in order to obtain an efficient representation of the object. Thus, the fewer primitives used in a tree will result in a better score and a more efficient representation. The better trees have lower scores.

In addition to determining the score, the system makes small adjustments in the primitives in order to optimize the score for each tree. The excess and uncovered voxels which are within a local area of the selected primitive are determined at step 225. The position, size, and orientation of the selected primitive are adjusted at steps 230, 235, and 240 based upon the local excess and uncovered regions. To adjust the position (step 230), the centers and areas of the local excess and local uncovered regions are determined. The position of the primitive is moved so that its center moves along the vector from the center of the local excess regions to the center of the local uncovered regions. The magnitude of the movement is determined by the ratio of the area of the local excess and local uncovered regions to the total area of the primitive.

The size is adjusted (step 235) in an amount proportional to the difference between the area of the local excess and local uncovered regions. If the local uncovered area is greater than local excess area, the size is increased; if the local excess area is greater than the local uncovered area, then the size is decreased.

Adjusting the orientation (step 240) is more difficult. A trial and error method can be used for two-dimensional objects. In the trial and error method, the primitive is rotated by a small angle and the score is recalculated. Rotation of the primitive by the small angle and recalculation of the score is repeated as long as the score continues to improve. If the score does not originally improve, then the primitive is rotated in the opposite direction by the small angle and the score recalculated. The process is repeated as long as the score improves for each rotation in the opposite direction. If the score does not improve by rotation in either direction, then the primitive remains at its original orientation.

In order to properly adjust the orientation in three dimensions, the principal axes of the local excess and uncovered regions must be determined. The principal axes can be determined by calculating the inertial tensor matrix for the local excess and local uncovered regions. The principal eigen-vectors of the two matrices give the principal axes of the excess and uncovered regions. The primitive can then be rotated so that its own principal axis moves away from the principal axis of the excess region and towards the principal axis of the uncovered region. The extent of rotation can be determined by the ratio of the volumes of the local excess and local uncovered regions.

Primitives which are combined through difference or intersection boolean operations may be considered "negative primitives" because they act as holes in the object. When adjusting these primitives, the movements are reversed. For example, the position of a negative primitive would be adjusted from the center of the local uncovered region to the center of the local excess region. These changes can be made either by reversing the types of movement or by reversing the definitions of excess and uncovered regions for negative primitives.

Once the position, size and orientation of one primitive has been adjusted, the score for the new CSG tree is calculated, step 250. If the score has improved, the system adopts the new CSG tree (step 255), and continues making adjustments to each of the primitives until the score ceases to improve (step 275) or until a maximum number of iterations have occurred (step 280).

The iterative process, as to selection of primitives for adjustment, types of adjustments, and number of adjustments, can be ordered in a variety of ways. The block flow diagram in FIG. 4 illustrates adjustment of the position, size, and orientation once for each primitive before any primitive is adjusted again. Thus, at step 260 determines whether the last primitive has been selected. If not, the next primitive is selected, step 265, and the evaluation and adjustment process is repeated. Alternatively, the position, size, and orientation could be iteratively adjusted for a first primitive to obtain the best score before a second primitive is adjusted. Another alternative is to adjust the position of a primitive to obtain the best score prior to adjusting the size or orientation. FIG. 4 illustrates a preferred embodiment for the order of iterations. Since the size, position, and orientation of all of the primitives are interrelated in covering the object, convergence to a local optimum is more likely to occur if all factors of all primitives are adjusted by small amounts once in each of several steps towards the local optimum.

Figure 6:
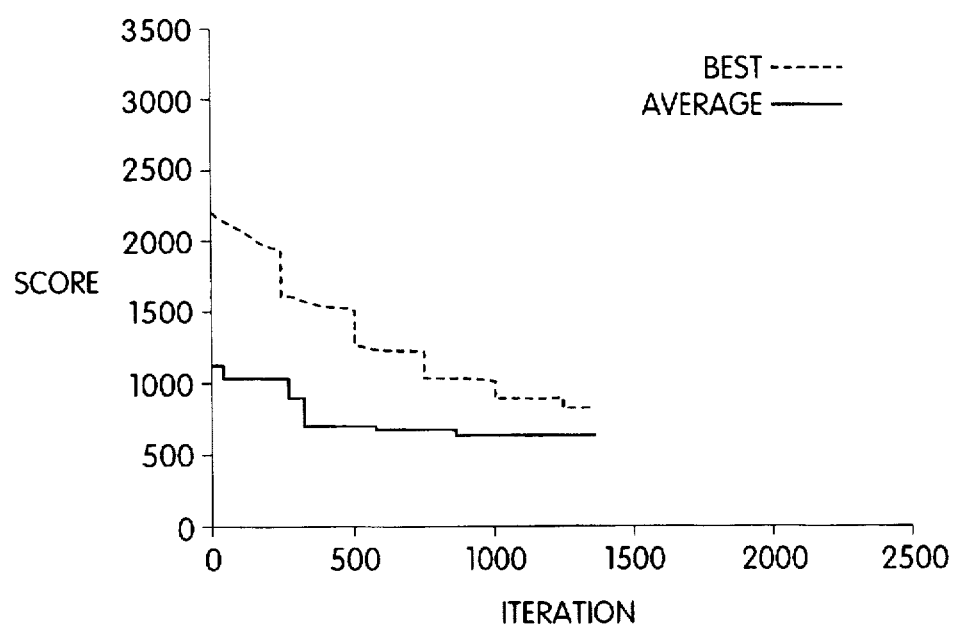
FIG. 6 illustrates improving representations obtained by an embodiment of the invention.

FIG. 6 is a graph illustrating operation of a system according to the present invention for finding a best fit for a CSG representation. As illustrated in the graph, as the number of iterations increases, both the best score and the average scores drop significantly. This indicates that not only does the best tree approach a minimal CSG representation of the object, but the population of trees, as a whole, also begins to approach reasonable representations of the object.

The process for creation of CSG representations for multiple objects uses the same procedures as for a single object. However, instead of a single population of CSG trees, multiple populations of trees are used, one population for each object. In the creation of the initial trees at step 110 (FIG. 2), each population is identical. Each tree has a corresponding tree in each population with the same primitives, boolean operators and structure. At step 115, the trees are optimized and evaluated. Each tree is optimized using the process described above with respect to FIG. 4 to best represent the object relating to the population. After optimization, the corresponding trees in each population differ solely as to the size, position, and orientation of the primitives in the trees. Each set of corresponding trees is given a total score which is the combination of the scores for the representation of the different objects.

In the mutating step, step 120, all of the corresponding trees in each population are identically mutated. The same primitives and boolean operators are added, changed, or deleted. Then, the mutated trees are again separately optimized and evaluated with respect to each object (step 125). Trees are determined to have improved (step 130) and are replaced (step 135) if the total score has improved. Additionally, upon reseeding, the trees are sorted and replace based upon the total score. In this manner, the chosen CSG representation will best represent all of the objects.

Figure 7A:
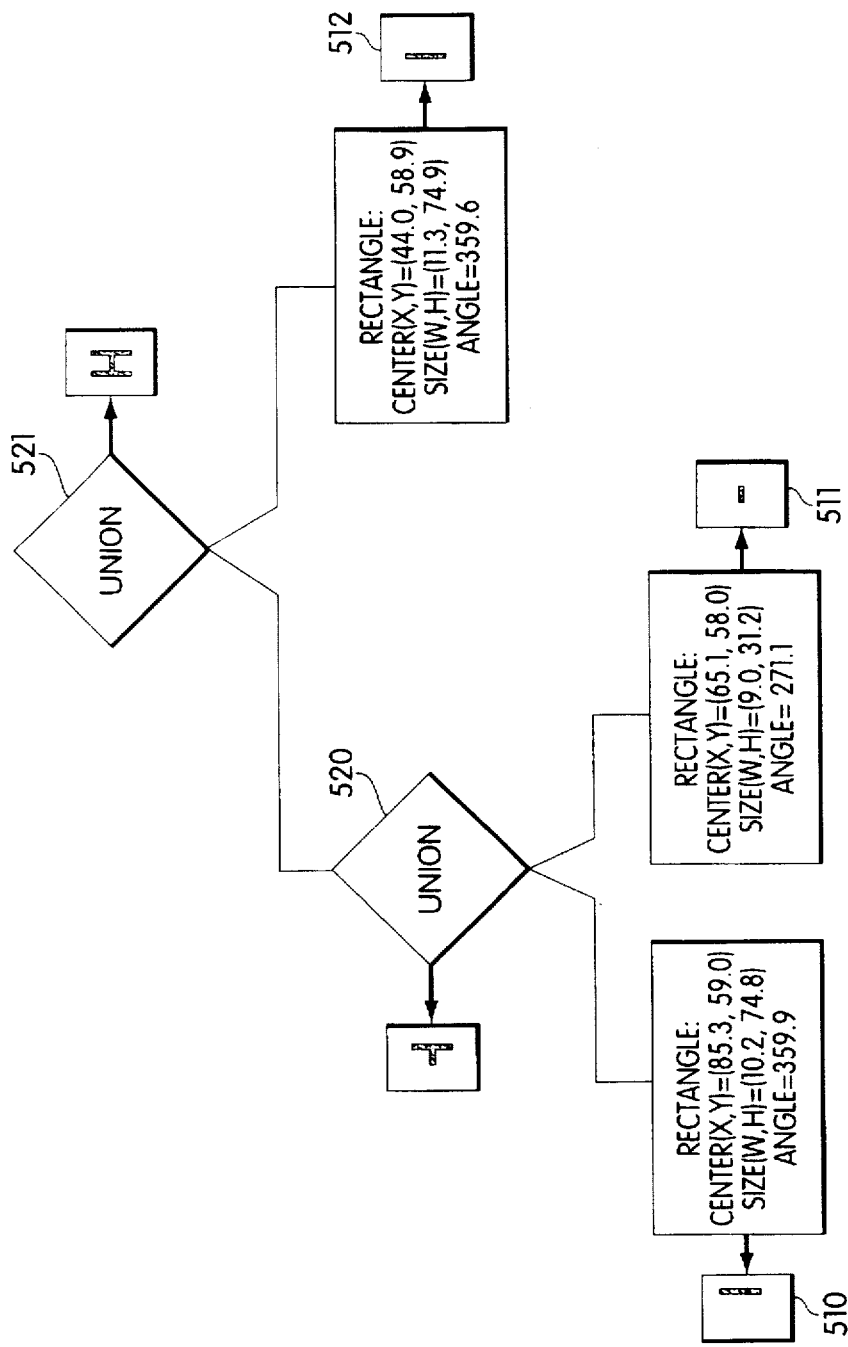
FIGS. 7A and 7B illustrate similar CSG tree structures for two objects.
Figure 7B:
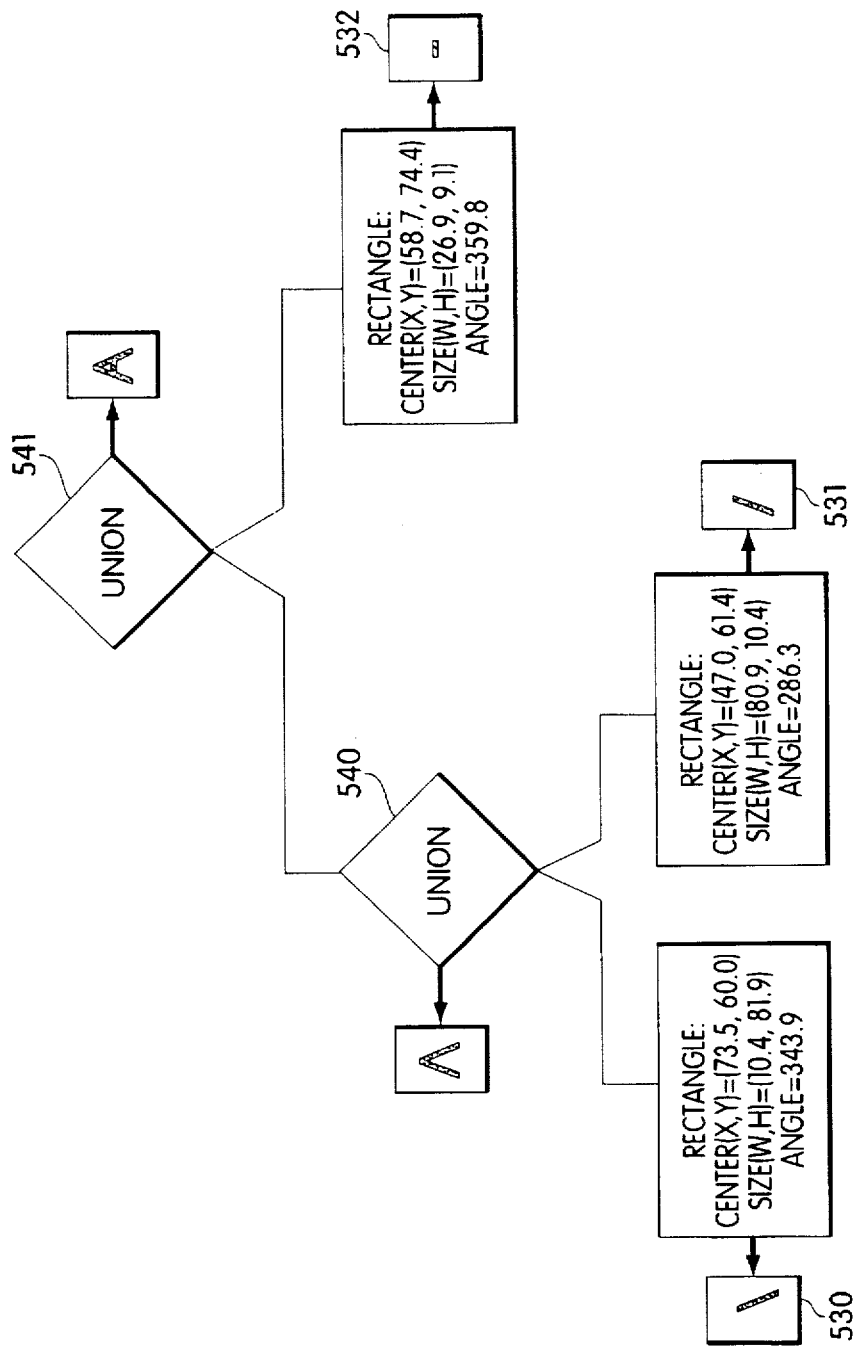

FIGS. 7A and 7B illustrate similar CSG representations created for two objects, letters A and H, by the process of the present invention. Each CSG representation has a similar structure with similar primitives 510-512, 530-531. The primitives are rectangles which differ solely as to size, position and orientation. Also, the same boolean operators (unions) are present at each node 520-521, 540-541. These two CSG representations can be easily manipulated to change one object into the other by separating the differences in size, position, and orientation of the primitives into steps, and adjusting each primitive at each step. Characteristics of the object can also be easily combined using the similar primitives.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A method for generating a constructive solid geometry (CSG) representation of multiple objects comprising the steps of:

similarly mutating one of each of a set of pluralities of CSG trees to create new CSG trees in each set, each set of CSG trees corresponding to one of the objects;

locally optimizing said new trees with respect to each object; and replacing said one of each set of said pluralities of trees with said new trees, if said new trees represent said objects better than said one of each set said plurality of CSG trees.

2. The method of claim 1, wherein said mutating step includes randomly mutating a random one of said sets of pluralities of CSG trees.

3. The method of claim 1, further comprising before said mutating step, the steps of:

generating sets of pluralities of random CSG trees as said sets of pluralities of CSG trees; and locally optimizing each of said plurality of random CSG trees with respect to a corresponding object.

4. The method of claim 1, wherein said mutating step includes one of changing a type of primitive in said one tree, changing a subtree structure in said one tree, adding a subtree in place of a primitive in said one tree, and deleting a subtree of said one tree.

5. The method of claim 1, further comprising the step of:

replacing a first portion of said sets of pluralities of trees with a second portion of said sets of pluralities of trees, wherein said first portion includes trees which least represent said object, and said second portion includes trees which best represent said object.

6. The method of claim 1, further comprising the step of determining a degree to which a set of corresponding trees, one tree being from each set of pluralities of trees, represents said objects based upon an area of each object not covered by a respective tree, an area of said respective trees which does not cover said objects, and a number of primitives in the trees.

7. The method of claim 1, further comprising before said mutating step, the step of scanning at least one object to determine dimensions of said at least one object.

8. The method of claim 1, wherein said locally optimizing step includes the steps of:

adjusting a position of a primitive in said one tree;

adjusting a size of said primitive; and adjusting an orientation of said primitive.

9. An apparatus for determining a constructive solid geometry (CSG) representation of a plurality of objects comprising:

mutating means for similarly mutating one of each of a set of pluralities of CSG trees to create new CSG trees in each set, each set of CSG trees corresponding to one of the objects;

optimizing means for locally optimizing said new trees with respect to each object; and replacement means for replacing said one of each set of said pluralities of trees with said new trees, if said new trees represents said objects better than said one of each set said plurality of CSG trees.

10. The apparatus of claim 9, wherein said mutating means randomly mutates a random set of corresponding trees in each set of said pluralities of CSG trees.

11. The apparatus of claim 10, wherein said optimizing means includes:

means for adjusting a position of a primitive in said one tree;

means for adjusting a size of said primitive; and means for adjusting an orientation of said primitive.

12. The apparatus of claim 9, further comprising:

tree generation means for generating a plurality of random CSG trees as said sets of pluralities of CSG trees; and initial optimizing means for locally optimizing each set of said pluralities of random CSG trees with respect to a corresponding object.

13. The apparatus of claim 9, wherein said mutating means includes at least one of:

means for changing a primitive in said one tree, means for changing an operator in said one tree, and means for replacing a subtree of said one tree.

14. The apparatus of claim 9, further comprising means for replacing a first portion of said sets of pluralities of trees with a second portion of said sets of pluralities of trees, wherein said first portion includes trees which least represent said objects, and said second portion includes trees which best represent said objects.

15. The apparatus of claim 9, further comprising:

means for determining a degree to which a set of corresponding trees represents said objects based upon an area of said objects not covered by a respective one of said corresponding trees, an area of a respective one of said corresponding trees which does not cover said respective object, and a number of primitives in the tree.

* * * * *